United States Patent [19]

Tarumi et al.

[11] Patent Number: 4,495,508
[45] Date of Patent: Jan. 22, 1985

[54] ELECTROSTATIC REPRODUCING APPARATUS

[75] Inventors: Noriyoshi Tarumi, Hachioji; Haruo Iwahashi, Fussa; Masahiko Matsunawa; Hiroshi Tokunaga, both of Hachioji, all of Japan

[73] Assignee: Konishiroku Photo Industry Co., Ltd., Tokyo, Japan

[21] Appl. No.: 314,209

[22] Filed: Oct. 23, 1981

[30] Foreign Application Priority Data

Nov. 5, 1980 [JP] Japan ............................ 55-154632
Dec. 1, 1980 [JP] Japan ............................ 55-168068

[51] Int. Cl.³ ............................................ G01D 15/06
[52] U.S. Cl. ............................. 346/159; 250/426; 361/229
[58] Field of Search ............... 346/159; 250/326, 426; 361/229, 230; 313/216, 217; 315/111.8

[56] References Cited

U.S. PATENT DOCUMENTS

| 3,582,958 | 6/1971 | Hendricks, Jr. | 346/159 |
| 3,611,414 | 10/1971 | Frank | 346/159 |
| 3,723,646 | 4/1971 | Behane | 346/159 X |
| 4,320,408 | 3/1982 | Iwasa et al. | 346/159 |

Primary Examiner—Thomas H. Tarcza
Attorney, Agent, or Firm—Jordan B. Bierman

[57] ABSTRACT

An electrostatic reproducing apparatus in which a passage of ions generated from an ion generator is modulated by an ion modulating electrode which modulates corresponding to image signals that are to be reproduced. An ion flow condensing electrode comprising an insulating plate and a conductive plate coated on one surface of said insulating plate is disposed between said ion generator and said ion modulating electrode. Said electrostatic reproducing apparatus comprises an electrode for deflecting the flow path of ion flow, said electrode for deflecting being disposed on the side opposite to said ion generator of said ion modulating electrode, and being applied with a predetermined potential with respect to said ion modulating electrode.

3 Claims, 11 Drawing Figures

PRIOR ART  FIG. 1
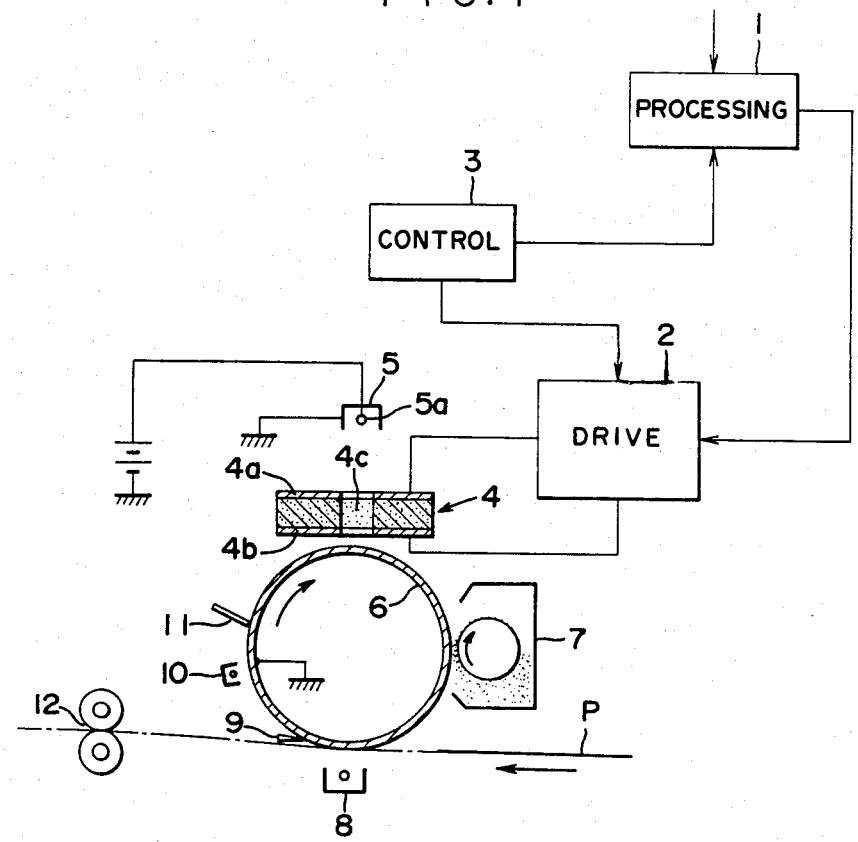
PRIOR ART  FIG. 2
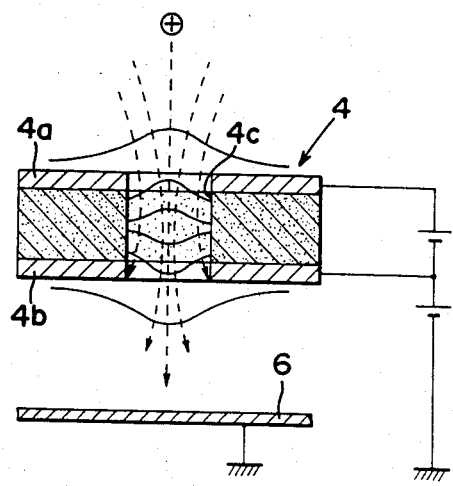

ELECTROSTATIC REPRODUCING APPARATUS

BACKGROUND OF THE INVENTION

1. Field of the Invention

The present invention relates to an electrostatic reproducing apparatus in which an equipotential surface is established between an ion generator and an ion modulating electrode to condense the ion flow and to increase its density, and the ion flow passing through said ion modulating electrode is improved.

2. Description of the Prior Art

Electrostatic reproducing apparatus of a variety of types have now been proposed to record onto a recording paper the image signal produced by the computer, the image signal transmitted over communication lines, and image signal obtained by converting original image into electric signals by solid stage image sensors such as CCD (Charge Coupled Device image sensor). In an electrostatic reproducing apparatus, an electrostatic latent image corresponding to an image signal is formed on a charge receptor such as photosensitive material, dielectric material and electrostatic recording paper. As a means for forming the electrostatic latent image, there is an electrostatic reproducing apparatus of the type in which electrostatic latent image is formed on a dielectric material by utilizing an ion modulating electrode which modulates corona ions produced by a corona wire or the like corresponding to image signals. FIG. 1 schematically illustrates an electrostatic reproducing apparatus of this type, according to which image signals obtained by photoelectrically converting an original image by the solid state image sensors such as CCD or electric image signals from a computer or transmitted over communication lines, are fed to a signal processing circuit 1, and the processed image signal are fed to a circuit 2 for driving an ion modulating electrode 4. Reference numeral 3 denotes a control circuit including a clock generator which provides timing for applying signals from the signal processing circuit 1 to the drive circuit 2. The ion modulating electrode 4 consists of an insulating layer coated on each side with a continuous layer 4a of a conductive material and a segmented layer 4b of a conductive material, and has a plurality of apertures 4c that are formed in a single row or in a plurality of rows. The segmented layer 4b of a conductive material is applied with image signals from the drive circuit 2. A corona ion generator 5 including a corona wire 5a is disposed above the ion modulating electrode 4, and a rotary drum 6 made of a dielectric material is located under the ion modulating electrode 4. Around the periphery of the dielectric rotary drum 6 are provided a developing device 7, a transfer electrode 8, a separating pawl 9, a charge eliminating electrode 10, and a cleaning blade 11, that are necessary for ordinary electrophotographic process. There is also provided a fixing device 12. The ions generated from the corona ion generator 5 pass through the apertures 4c being controlled by control signals applied to the segmented layer 4b of the ion modulating electrode 4. Therefore, an electrostatic latent image corresponding to the original image signal that are to be reproduced is formed on the dielectric material of the rotary drum 6. The thus formed electrostatic latent image is developed by a developer in the developing device 7, and is transferred onto the recording paper P by the transfer electrode 8. Thereafter, the recording paper P is separated from the dielectric rotary drum 6 by the separating pawl 9, and is ejected out of the apparatus after the toner image has been fixed by the fixing device 12.

The electrostatic reproducing method employing the ion modulating electrode is capable of reproducing images of a high quality having excellent resolution and toner reproduction, maintaining the electrode and the electrostatic image-forming member such as dielectric member apart (0.1 to 2.0 mm). This method, however, presents the problem that the recording speed is low because (1) there is a limit in the current density of corona ion generated by the ion generator (about 10 $\mu A/cm^2$), and (2) there is a lower limit in the ion control time due to the mobility of ions. Therefore, the above-mentioned method had been used simply for a printer utilizing ink mist (e.g. U.S. Pat. No. 3,779,166). Accordingly, the electrostatic reproducing system of the present time chiefly employs a multistylus electrode. In order to increase the recording speed in the electrostatic reproducing method employing and ion modulating electrode, therefore, there can be proposed a method of using an ion generating source (utilizing, for example, a high-frequency discharge or a spark discharge) as a substitute for the ion generator which employs the corona wire, resulting, however, in a complicated construction as compared with the apparatus using the corona wire.

FIG. 2 shows the ion flow by the conventional ion modulating electrode, in which solid lines represent equipotential surfaces, and broken lines represent ion flow path. The ion stream generated by the corona wire 5a flows toward the ion modulating electrode 4 according to the equipotential surface established by the potential difference between the corona wire 5a and the continuous layer 4a, and enters into the apertures 4c. In order to increase the proportion of ions that enter into the apertures 4c, the potential difference between the continuous layer and the segmented layer is increased. Then, the equipotential surface is established as indicated by solid lines in FIG. 2, the ion flow paths are also established as indicated by broken lines. If the potential difference is decreased, the amount of ions that enter is reduced, and the amount of ions that pass through is reduced. In order to increase the recording speed, therefore, the potential difference must be increased between the continuous layer of a conductive material and the segmented layer of a conductive material. In this case, portions of the ion flow entering the apertures 4c may adhere onto the insulation layer between the continuous layer 4a and the segmented layer 4b, and another portion of the ion flow may be attracted by the segmented layer 4b, so that the passing ratio of ion flow decreases to less than 10%. Here, the ion flow passing ratio stands for a ratio of an electric current by the ion flow that passes through the apertures 4c to an electric current by the ion flow that enter into the apertures 4c of the ion modulating electrode.

SUMMARY OF THE INVENTION

In order to increase the density of ion flow generated from the ion generator employing the corona wire, the apparatus of the present invention is provided with a condensing electrode between the corona wire and the ion modulating electrode.

According to the present invention, furthermore, another electrode is provided between the ion modulating electrode and a charge-retaining member in order to increase the ion flow passing ratio. This construction makes it possible to increase the ion passing ratio without the need of increasing the intensity of equipotential surface (potential difference) between the ion modulating electrode and the recording member and, hence, enables the recording speed to be increased.

Other objects and features of the present invention will become obvious from the following description in conjunction with the accompanying drawings.

BRIEF DESCRIPTION OF THE DRAWINGS

FIG. 1 is a diagram schematically illustrating an electrostatic reproducing apparatus employing an the usual ion modulating electrode;

FIG. 2 is a diagram schematically illustrating the setup of an electrostatic image forming portion of a conventional electrostatic reproducing apparatus;

DESCRIPTION OF THE PREFERRED EMBODIMENTS

Figure 3:
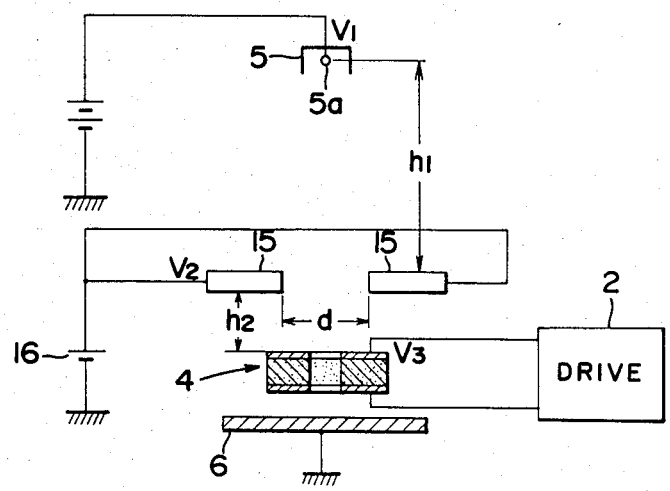
FIG. 3 is a diagram schematically illustrating an electrostatic image forming portion of an electrostatic reproducing apparatus according to the present invention.

FIG. 3 shows an ion modulating electrode used for the electrostatic reproducing apparatus according to an embodiment of the present invention, in which a condensing electrode 15 is disposed between a corona ion generator 5 and an ion modulating electrode 4. A voltage of a DC power supply 16 is applied to the condensing electrode 15, or a constant voltage device and like is connected between the condensing electrode 15 and ground to form a self biasing system.

The voltage applied to the condensing electrode 15 should be about and intermediate value of the voltage applied to the corona wire 5a. The condensing electrode 15 forms an equipotential surface that works to deflect the ion flow generated from the corona ion generator 5 to the aperture and forms an equipotential surface for discharge in the vicinity of a corona wire 5a. For this purpose, the corona wire 5a and the condensing electrode 15 should be disposed relatively close to each other to establish an intense equipotential surface for corona discharge. The equipotential surface established in this case is considerably stronger than the equipotential surface established by a corona generating apparatus that is usually used for the electrophotographic copying machines.

To establish such an intense equipotential surface, the condensing electrode 15 should be separated from the corona wire 5a by a distance of 1 to 5 mm, and a potential should be applied thereto with respect to the potential $V_1$ applied to the corona wire 5a. Namely, the potential difference ($V_1 - V_2$) should preferably be 3 to 8 KV. If now the condensing electrode made of a flat metal is employed, the following numerical values can be preferably employed:

$h_1 = 1.5$ to 2.5 mm
$d = 0.2$ to 1.0 mm
$V_2 - V_3 = 0.5$ to 1.5 KV
$h_2 = 0.5$ to 1.5 mm
$V_1 - V_2 = 3$ to 6 KV

Figure 4:
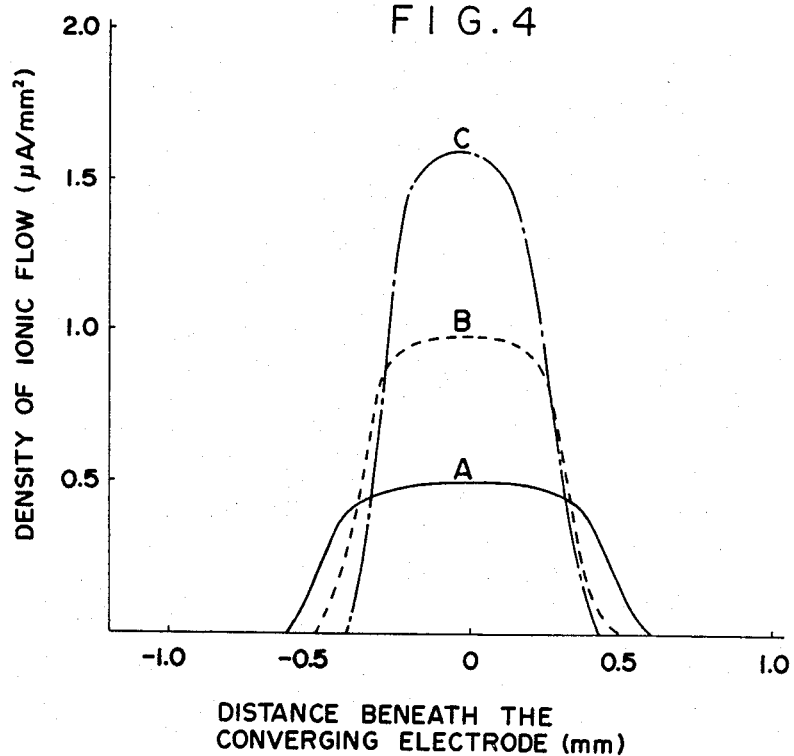
FIG. 4 is a graph showing the difference of the density of ion flow when the potential of the condensing electrode is varied.
Figure 5:
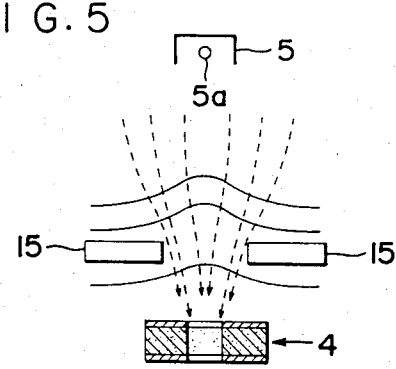
FIGS. 5 to 8 are diagrams showing condensing electrodes used for the electrostatic image forming portion of the electrostatic reproducing apparatus according to modified embodiments of the present invention.

A solid line A, a broken line B and a dot-dash line C of FIG. 4 represent changes in the density of ion flow that passes through apertures of the ion modulating electrode when $V_1 - V_2 = 4.5$ KV, $h_1 = 0.5$ mm, $h_2 = 1.0$ mm, $d = 0.75$ mm, and when $V_2$ is changed to 0.5 KV, 1.0 KV, 1.5 KV. As will be understood from FIG. 4, the density of ion flow increases and the width of the ion flow decreases with the increase in the potential $V_2$. According to this embodiment, the equipotential surfaces are formed as indicated by solid lines in FIG. 5. Therefore, the flow path of ion flow become as indicated by broken lines, and an ion flow of increased density reaches the ion modulating electrode.

Figure 6:
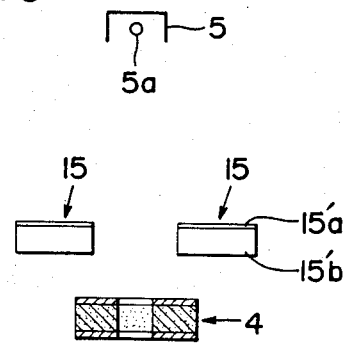

FIG. 6 illustrates another embodiment of the present invention, and shows the relative position between the ion generator 5, the condensing electrode 15 and the ion modulating electrode 4. According to this embodiment, the ion condensing electrode has a copper plate $15'b$ coated on one surface of the insulating plate $15'a$, and is disposed on the side away from the ion modulating electrode. In this case, increased electrical insulation is obtained relative to the ion modulating electrode.

Figure 7:
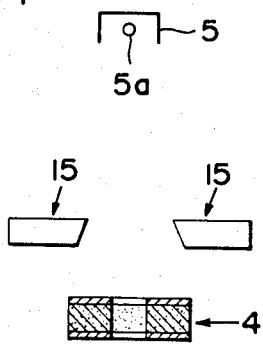

FIG. 7 illustrates a further embodiment in which the condensing electrode 15 is widened from the side of the ion generator 5 toward the side of the ion modulating electrode 4. With this construction, the equipotential surface formed under the condensing electrode 15 swells in a region where the ion flow passes; i.e., the ion flow is deflected effectively.

Figure 8:
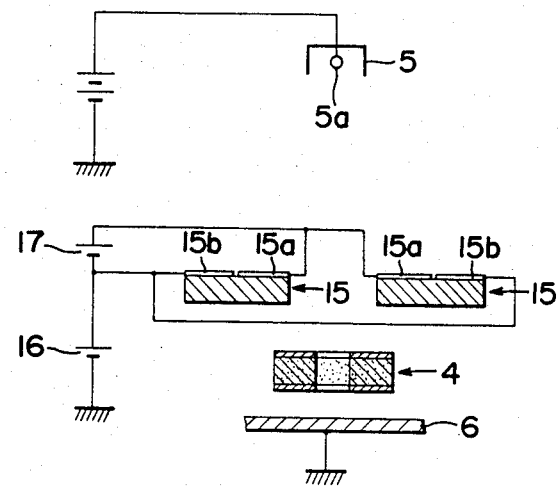

FIG. 8 shows a still further embodiment of the present invention in which the condensing electrode 15 is divided, for example, into two portions 15a and 15b, and different voltages are applied thereto from the power supplies 16 and 17 to deflect the ion flow and to increase the density of ions. When the negative ions are to be transmitted, the polarity of the above voltages should be reversed.

Figure 9:
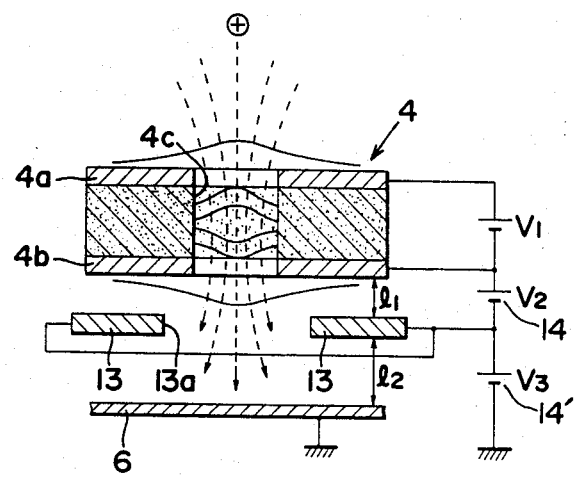
FIG. 9 is a diagram of the electrostatic image forming portion according to the present invention.

FIG. 9 shows yet further embodiment of the electrostatic image forming portion of the electrostatic reproducing apparatus according to the present invention. According to this embodiment, an electrode 13 having a slit 13a for passing ions is provided between the segmented layer 4b of the ion modulating electrode 4 and the charge-retaining member 6, and the electrode 13 is applied with a potential from a DC power supply 14 with respect to the segmented layer 4b, and is also applied with a potential from a DC power supply 14' with respect to ground. Potentials $V_1$, $V_2$ and $V_3$ show the state that ions are passed, namely, the ion modulating electrode 4 is switched ON. When the positive ions are used, the potential which is applied to the electrode 13 should be lower by about 300 to 500 volts than the potential of the segmented layer when the ions are being transmitted. Thus, by providing the electrode 13 with a suitable potential, the equipotential lines are established as shown in FIG. 9, the paths (trajectories) of ion flow are corrected as indicated by broken lines, and the passing ratio of ions that pass through the apertures 4c are increased.

An ion modulating electrode consisting of an insulating layer of an embodiment of 25 μm and layers of conductive material each having an embodiment of 18 μm, was used, positive ions were employed so that the potential difference $V_1$ between the continuous layer and the segmented layer was 200 to 300 volts when the ions were passing, and the electrode 13 was provided maintaining a distance $l_1$ of smaller than 0.5 mm. When $V_2$ was smaller than 500 volts, the passing ratio was 50% (the embodiment of the electrode 13 being from 20 to 50 μm).

Further, when the embodiment of the electrode 13 is same as above and the embodiment of the segmented layer 4b of the ion modulating electrode 4 was reduced to less than about several microns, the ion passing ratio could be further increased. Namely, the ion passing ratio could be increased to at least about 60%. The ion passing ratio of 60% was obtained under the above-mentioned conditions using the ion modulating electrode consisting of an insulating layer of an embodiment of 25 μm and the electrode layers of conductive material each having an embodiment of 2 μm.

Figure 10:
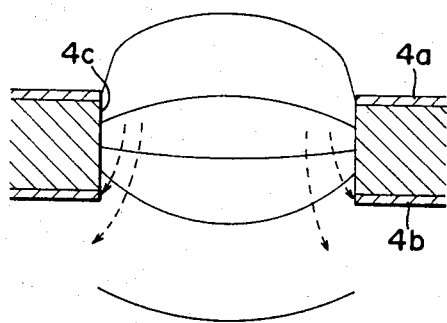
FIG. 10 is a diagram of the equipotential surface established by a conventional ion modulating electrode.
Figure 11:
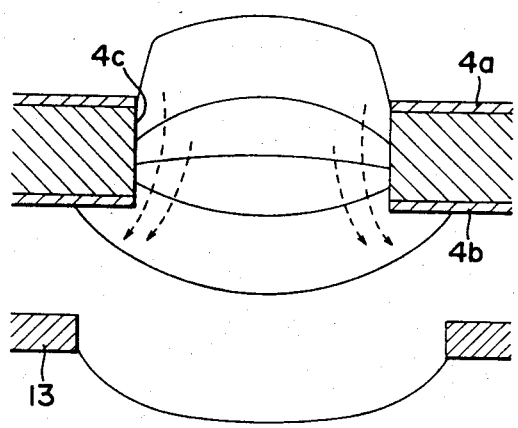
FIG. 11 is a diagram of the equipotential surface established by an ion modulating electrode of the present invention.

FIG. 10 is a diagram illustrating the equipotential surface established by the ion modulating electrode of FIG. 2, and FIG. 11 is a diagram illustrating the equipotential surface established by the ion modulating electrode of the present invention. As will be understood from FIG. 11, provision of the electrode 13 helps deflect the flow path of ion flow (broken arrows) so that increased amounts of ions pass through the apertures 4c.

As illustrated in the foregoing, the equipotential surface for generating ions can be increased and the ion flow of a high density can be obtained if a condensing electrode which works to deflect the ion flow and form an equipotential surface near corona wire for discharge is disposed between the corona wire and the ion modulating electrode. The density of ion flow according to the present invention reaches as great as 500 to 1,500 $\mu A/cm^2$ compared with the density of ion flow of about 10 $\mu A/cm^2$ as obtained by the conventional ion generator employing the corona wire. The condensing electrode of the present invention also forms an equipotential surface that works to deflect the ion flow. Accordingly, the density of ion flow can further be doubled owing to the equipotential surface. According to the electrostatic reproducing apparatus employing the ion modulating electrode of the present invention as mentioned above, the density of ion flow can be increased to reproduce the electrostatic latent image at high speeds, and electrophotographic copying machines, facsimiles and printers that feature high speeds can be realized.

Moreover, the ion passing ratio can be increased, i.e., the amount of ion flow that reaches the charge-retaining member passing through apertures in the ion modulating electrode can be increased if an electrode is provided between the segmented layer of the ion modulating electrode and the charge-retaining member, thereby to increase the recording speed. Consequently, a high-speed electrophotographic copying machine can be realized, and can be adapted to the facsimiles and the printers.

It is to be understood that an ink mist method can be applied on the electrostatic reproducing apparatus of the present invention and in such embodiment a high speed printing higher than that of the conventional ink mist printer can be carried out. The ink mist method is disclosed in the material "Electrophotography" pages 208–209 written by Schaffert, for example.

What is claimed is:

1. In an electrostatic reproducing apparatus of the type comprising an ion modulating electrode having a control electrode and a common electrode formed as a unit with said control electrode through an insulating layer, and having at least one aperture therethrough, a charge retaining drum positioned at one side of said ion modulating electrode, an ion generator arranged at the other side thereof, and a source of voltage applied to said ion generator, wherein the passing of ions through said aperture is controlled according to an electric control signal applied to said control electrode, the improvement comprising another electrode having a through-hole larger than said aperture, spaced from and coaxial with said ion modulating electrode, and a voltage source lower in absolute value than the voltage applied to said ion generator applied to said other electrode, whereby ions passing through said ion modulating electrode are condensed.

2. In an electrostatic reproducing apparatus according to claim 1, in which said improvement comprises positioning said other electrode between said ion modulating electrode and said ion generator.

3. In an electrostatic reproducing apparatus according to claim 1, in which said improvement comprises positioning said other electrode between said ion modulating electrode and said charge retaining drum.

* * * * *